United States Patent [19]

Parke

[11] Patent Number: 5,083,202
[45] Date of Patent: Jan. 21, 1992

[54] MOTION DETECTOR FOR VIDEO SIGNALS INCLUDING A NOVEL LINE COMPARISON PROCESSING SCHEME

[75] Inventor: Ian Parke, Ipswich, England

[73] Assignee: British Telecommunications public limited company, United Kingdom

[21] Appl. No.: 469,494

[22] PCT Filed: Sep. 22, 1988

[86] PCT No.: PCT/GB88/00781
§ 371 Date: Apr. 13, 1990
§ 102(e) Date: Apr. 13, 1990

[87] PCT Pub. No.: WO89/03152
PCT Pub. Date: Apr. 6, 1989

[30] Foreign Application Priority Data
Sep. 25, 1987 [GB] United Kingdom ............... 8722612

[51] Int. Cl.$^5$ .............................................. H04N 7/12
[52] U.S. Cl. ...................................... 358/105; 358/136
[58] Field of Search .......................... 358/105, 136, 135

[56] References Cited
U.S. PATENT DOCUMENTS

| | | | |
|---|---|---|---|
| 4,656,511 | 4/1987 | Koga | 358/136 |
| 4,670,851 | 6/1987 | Murakami et al. | 364/518 |
| 4,800,425 | 1/1989 | Schwerzel et al. | 358/136 |
| 4,897,720 | 1/1990 | Wu et al. | 358/136 |
| 4,933,761 | 6/1990 | Murakami et al. | 358/136 X |

OTHER PUBLICATIONS

"Correlation Techniques of Image Registration" IEEE Transactions, vol. AES-10, #3, May 1974; Pratt.
"Interface Television Coding Using Movement Compensation"; IEEE June 1979; Robbins et al.
"Motion Compensated Prediction for Inter-Frame Coding Systems" *Electronics and Communications* vol. 64B #1, '81; Ninomiya et al.

*Primary Examiner*—Victor R. Kostak
*Attorney, Agent, or Firm*—Nixon & Vanderhye

[57] ABSTRACT

A motion vector suitable for motion-compensated prediction in an inter-frame differential video coder is derived by comparison of each block of a current frame and with shifted corresponding region of a previous frame with the regions of the previous frame. Rather than dealing with each block in turn, the apparatus carries out all comparisons involving a line n of the video signal before commencing comparisons involving n+p (where p is the number of lines encompassed by a block).

19 Claims, 5 Drawing Sheets

MOTION DETECTOR FOR VIDEO SIGNALS INCLUDING A NOVEL LINE COMPARISON PROCESSING SCHEME

FIELD OF THE INVENTION

The present invention concerns motion estimation, particularly, though not exclusively, in the context of video coders employing inter-frame differential coding.

BACKGROUND OF THE INVENTION

Figure 1:
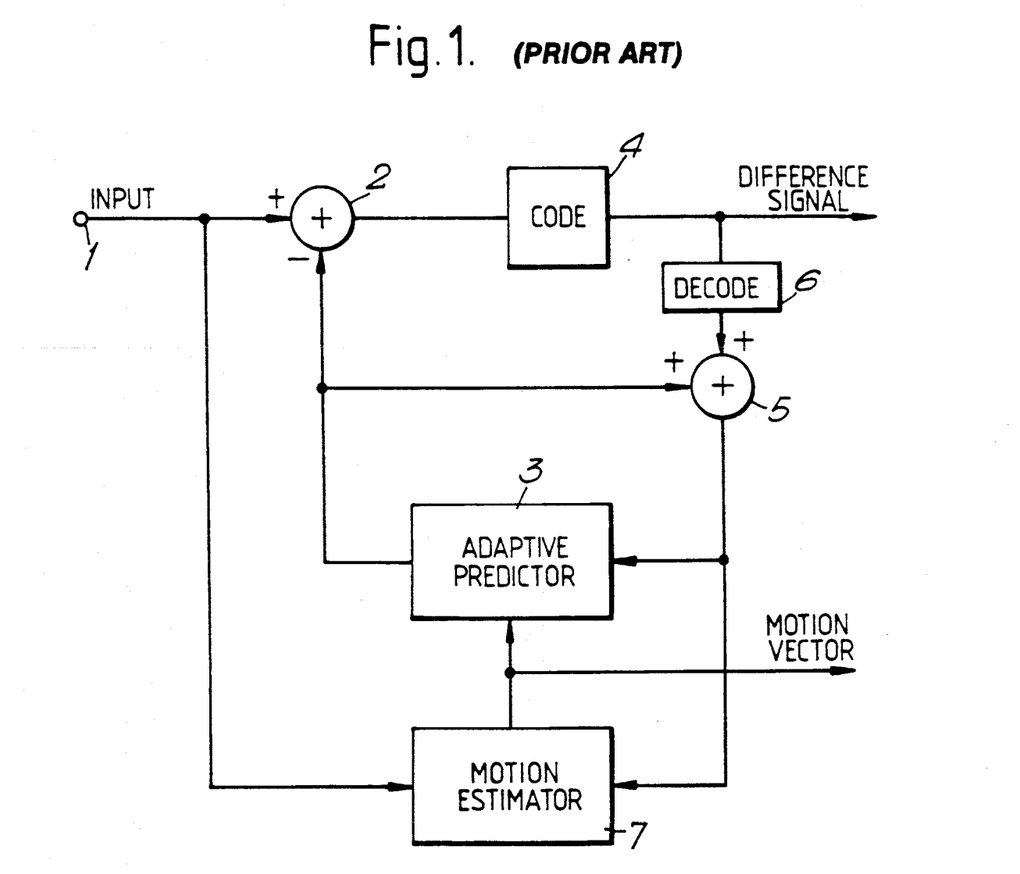
FIG. 1 is a known video coder.

FIG. 1 shows a known form of video coder. Video signals (commonly in digital form) are received at an input 1. A subtractor 2 forms the difference between the input and a predicted signal from a predictor 3 which is then further coded in box 4. The coding performed here is not material to the present invention, but may include thresholding (to suppress transmission of zero or minor differencs) quantisation or transform coding for example. The input to the predictor is the sum, formed in an adder 2 of the prediction and the coded difference signal decoded in a local decoder 6 (so that loss of information in the coding and decoing process is included in the predictor loop).

The differential coding is essentially inter-frame, and the predictor 3 could simply consist of a one-frame delay; as shown however a motion estimator 7 is also included. This comapres the frame of the picture being coded with the previous frame being supplied to the predictor. For each block of the current frame (into which the picture is regarded as divided) it identifies that region of the previous frame which the block most closely resembles. The vector difference in position between the identified region and the block in question is termed a motion vector (since it usually represents motion of an object within the scene depicted by the television picture) and is applied to the predictor to shift the identified region of the previous frame into the position of the relevant block in the current frame, thereby making the predictor output a better prediction. This results in the differences formed by the substractor 2 being, on average, smaller and permits the coder 4 to encode the picture using a lower bit rate than would otherwise be the case.

The motion estimator must typically compare each block with the corresponding block of the previous frame and regions positionally shifted from that block position; this involves a considerable amount of processing and often necessitates many accesses to stored versions of both frames.

The present invention is defined in the claims.

BRIEF DESCRIPTION OF THE DRAWING FIGURES

One embodiment of the invention will now be described, with reference to the accompanying drawings, in which.

DETAILED DESCRIPTION OF THE DRAWING FIGURES

Figure 2:
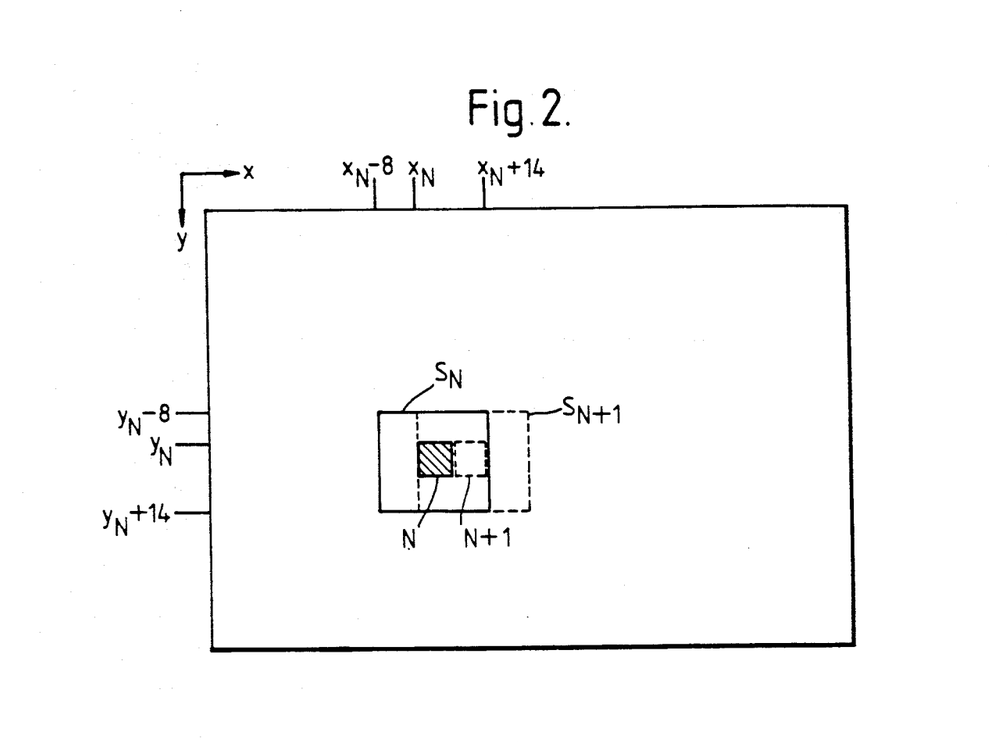
FIG. 2 is a diagram of a television picture illustrating a co-ordinate system and search area.

The motino estimator to be described regards a "current" frame of a television picture which is being coded as being divided into $8 \times 8$ blocks—that is, eight picture elements (pixels) horizontally by eight lines vertically. Although the principles are equally applicable to interlaced systems, for simplicity of description a non-interlaced picture is assumed. It is designed to generate for each block a motion vector which indicates the position of the $8 \times 8$ region, lying within a defined search area of the (or a) previous frame of the picture, which is most similar to the block in question. FIG. 2 illustrates a field with an $8 \times 8$ block N (shaded) and a typical associated $23 \times 23$ search area indicated by a rectangle $S_N$. If the pixels horizontally and lines vertically are identified by coordinates x, y, with an origin at the top left-hand corner, then the search area for a block whose upper left hand corner pixel has coordinates $x_N$, $y_N$ is the area extending horizontally from $(x_N-8)$ to $(x_N+14)$ and verticlaly from $(y_N-8)$ to $(y_N+14)$.

In order to obtain the motion vector it is necessary to conduct a search in which the block is compared with each of the 256 possible $8 \times 8$ regions of the previous frame lying within the search area—i.e. those whose upper left pixel has coordinates $x_N+u$, $y_N+v$ where u and v are in the range $-8$ to $+7$. The motion vector is the values of u,v for which the comparison indicates the greatest similarity. The test for similarity can be any conventionally used—e.g. the sum of the absolute values (or other monotonically increasing even function) of the differences between each of the pixels in the "current" block and the relevant region of the previous frame.

Thus, if the current frame and previous frame pixel values are a(i,j) and b(i,j) respectively then the sum of differences is $$E_{x,y}(v,u) = \sum_{i=0}^{7} \sum_{j=0}^{7} |a(x+i, y+j) - b(x+u+i, y+v+j)|$$

Commonly the search is carried out for each block of the current picture in turn. However because the search area associated with a block overlaps the search areas of a number (24 in the case of blocks not close to the edge of the picture) of other blocks this (see the search area shown dotted in FIG. 2 for block N+1) often requires multiple accesses to the previous frame information stored in a frame store, which are time consuming and may interfere with other coder functions.

The motion estimator to be described is assumed to be provided, in real time, with (a) a digital video signal corresponding to the "current" frame of a picture to be coded.

(b) a digital video signal corresponding to the previous frame of the picture.

The signals consist of a sequence of 8-bit digital words representing the luminance of successive picture elements of the first line, (though chrominance signals could be similarly processed if desired) followed by similar sequences for the second, third and subsequent lines.

Figure 3:
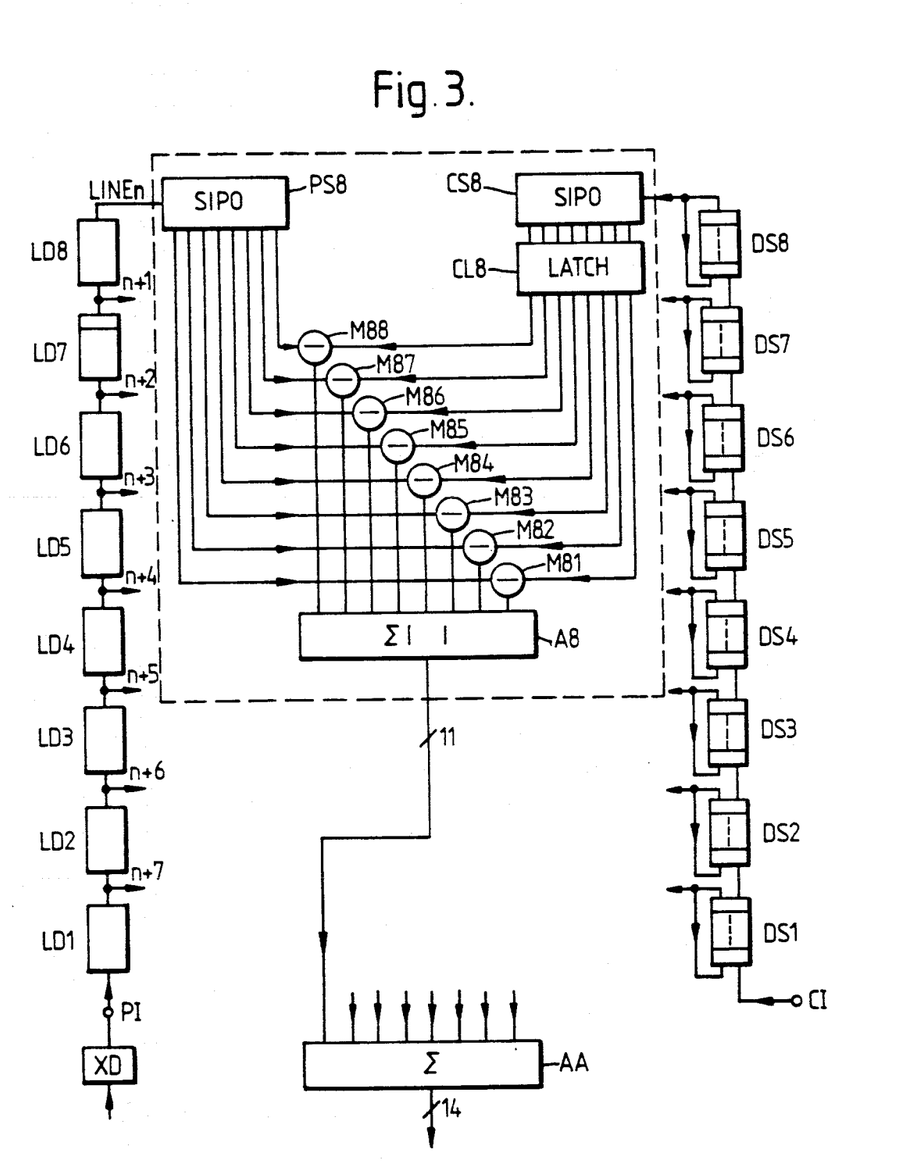
FIG. 3 is a block diagram of aprt (P1 of FIG. 5) of a motion estimator according to the invention.
Figure 4:
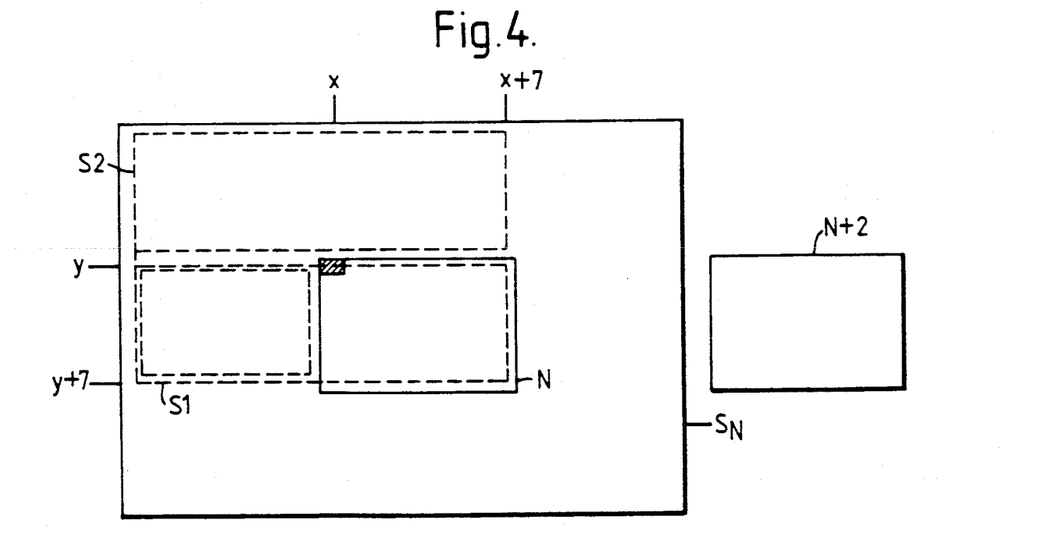
FIG. 4 is a diagram of the search area $S_N$ of FIG. 2.

FIG. 3 shows part of the apparatus, the operation of which will be described with reference to FIG. 4. The "position" in the picture of an $8 \times 8$ block or region will be considered as defined by the x,y coordinates of its upper left pixel. Thus the block N in FIG. 4 is at position x,y. The apparatus of FIG. 2 serves to compare the 8×8 block N at x,y with the 8×8 regions at (x+u),(y+v) where u ragnes from −8 to +7 and v from 0 to +7—i.e. the regions whose positions are within the lower broken line area S1 in FIG. 4. In FIG. 3, the previous frame is received (following a 9-pixel delay XD, the purpose of which will be apparent later) at an input PI (all signals paths in the Figure are 8-bit unless otherwise indicated by a diagonal bar and adjacent number). This supplies a tapped delay line consisting of eight one-line delay units LD1 . . . LD8, so that the signal for any line of the picture is available at the output of LD8 and that for the seven later lines is available at the outputs of LD7, LD6 etc. The current picture signal is supplied via input CI to a delay line with storage having eight sections DS1 . . . DS8. Each section consists of two delay units of one line period duration; one half of each section forms part of an eight line period delay line and the other half forms a reciculating store. When the last line of a group of eight lines has entered the delay line, the roles of the two halves of each section are reversed so that while the next egith lines are entering the delay line the eight already entered are repeatedly available at the outputs of the recirulating sections.

Thus, referring to FIG. 4, (and ignoring the 9-pixel offset and assuming that line y is the first of a block) at the conclusion of line y+7, lines y, y+1 . . . y+7 of the current frame are about to be output from DS8, DS7 . . . DS1, whilst lines y,y+1, . . . y+7 of the previous frame are about to be output from LD8, LD7, . . . LD1.

The outputs of LD8 and DS8 feed respective (8-bit wide) 8-stage serial in parallel out (SIPO) registers PS8, CS8 clocked at pixel rate. The eight outputs of the latter are latched in a latch CL8 every 16 pixels synchronously with the horizontal block structure of the frame. Thus, once pixel x+7 of line y has entered the SIPO CS8, pixels x to (x+7) are available at the output of latch CL8 on the next clock pulse. At this time, pixels x−8 to x−1 are available at the outputs of the SIPO PS8 (due to the 9-pixel delay XD).

The outputs of the PS8 and CL8 are supplied to subtractors M81–M88; the sum of the moduli of the differences is formed in a summation unit A8. Thus in the cicumstances described in the preceding paragraph, the summer output represents the "sum of differences" between the first line of the current picture block N, and the first line of the region indicated by chain-dot lines in FIG. 4.

The arrangement consisting of PS8,CS8, CL8, M81–M88 and A8 is provided for the outputs of LD8 and DS8; seven further such arragnements are provided (though, for clarity, not shown in FIG. 3) for the outputs of LD7/DS7, LD6/DS6 . . . LD1/DS1. They function in an identical manner, except hat, being connected to earlier taps of the delay lines, they operate on the seven later lines of the picture. The outputs of the summers A8 . . . A1 are added in an adder AA which produces the "sum of differences" between the current block N and the 8×8 region of the previous frame idnicated by the chain-dot lines in FIG. 4. This is the value $E_{x,y}(-8,0)$ according to the definition given above.

One pixel clock cycle later, the SIPO's PS8 . . . 1 now contain pixels x−7 to x instead of x−8 to x−1. The output of the latch CL8 is unchanged, thus the comparison now is between the current block and block (x−7), 0 and adder AA produces an output $E_{x,y}(-7,0)$. This process continues for 16 clock cycles, at the conclusion of which the adder AA has produced 16 results $E(-8,0),E(-7,0)$. The first pass of the search area S1 in FIG. 4 is now complete.

The pixels of the next-but-one block N+2 of the current frame (i.e. those with horizontal co-ordinates x+16) to (x+23)) are now present in the SIPO's CS8 . . . ; these are clocked into the latches CL8 . . . , at which point pixels (x+8) to (x+15) are available at PS8, corresponding to search position for the new block, and the first pass now proceeds for block N+2, and successive alternate blocks until the end of the line.

At the conclusion of a line period, line y+1 of the previous frame is appearing at the output of LD*; however, by the recirculating action of DS8, line y of the current frame appears again at the output of DS8, and the second pass for block N takes place, it being this time compared with the chain-dot region of FIG. 4, shifted down by one line. It will be seen, that after eight line periods, a comparison will have been made between block N and all the regions defined by the area S1 (and similarly for all the even numbered blocks in a row).

When this has occurred, the delay and store stages DS8 . . . are clocked and lines y+8 to y+15 of the current frame now become available at their outputs. Line y+8 of the previous frame is just about to appear at the output of delay LD8, and the arrangement of FIG. 2 is ready to accommodate the next row of blocks.

It will be seen that subtractors N, summation units A and adder AA thus form arithmetic means to compare each block of the current frame with the corresponding region of the previous frame and with a plurality of positionally shifted regions of the previous frame. Unlike the block-by-block approach mentioned earlier, the arithmetic means is arranged so that all comparisons involving a particular line of the picture are carried out consecutively. As can be seen, this requires a storage capacity of only a total of sixteen line delays for the previous frame.

Figure 5:
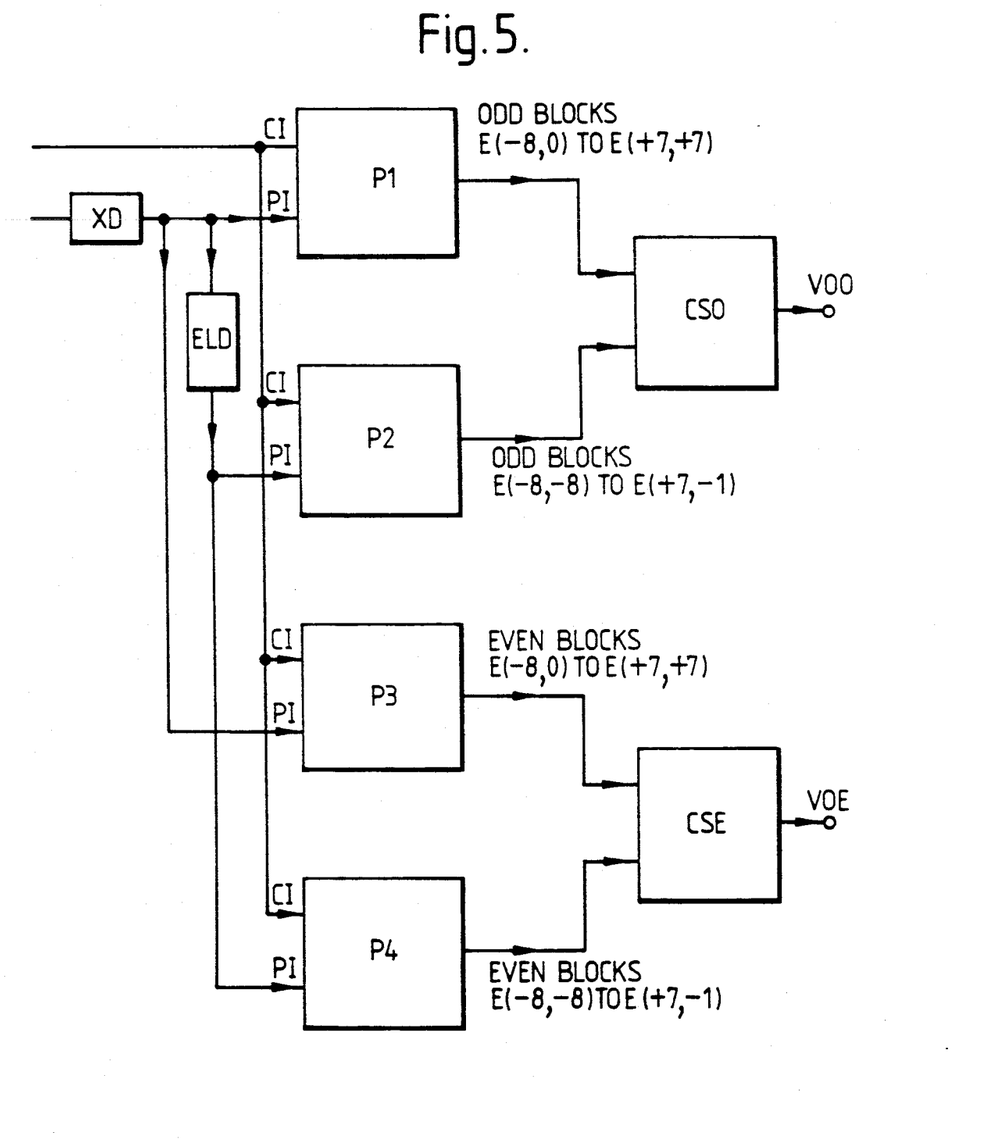
FIG. 5 is a block diagram of a complete motion estimator.

It will be observed however that the search process for block N is incomplete; the search area S2 (FIG. 4) has not been dealt with. Also the odd numbered blocks have received no attention. Referring now to FIG. 5, the arrangements of FIG. 3 (apart from delay XD) now appear as processor P1. A second processor P2 handles the upper search area S2; it is identical in all respects to P1 but is supplied with the previous frame signal via an 8 line delay (shown explicitly as ELD though in practice the signal could be tapped from LD8 of the processor P1), giving the desired result of defining a search area S2 which is 8 ines earlier than S1. It is noted in passing that were the search $S_N$ area smaller (i.e. 17×17 or less rather than 23×23) one processor (suitably timed) would suffice.

The even-numbered blocks are handled by a further pair of processors P3, P4 which are identical to P1 and P2 and receive the same signal inputs as P1 and P2 respectively. However their latches CL8 are clocked (every 16 pixels as before) with pulses which are 8 pixels out of phase with those supplied to the processors P1 and P2. Although the figure shows identical processors (which may be a convenient modular hardware implementation), certain of the elements within the processors may if desired be common to two or more of the processors, (e.g. the lines DS8 . . . DS1).

We will now consider the further processing of the "sum of difference" values E. It is necessary to find for each block of the current frame the position (u,v) giving the lowest E. Since the E values for a given block appear over an 8-line period, interspersed with those for other blocks in the same horizontal row, a degree of sorting is also necessary. Two compare and sort units CSE,CSO are shown in FIG. 5 for the even and odd blocks respectively, with outputs VOE,VOO for the output motion vectors.

Figure 6:
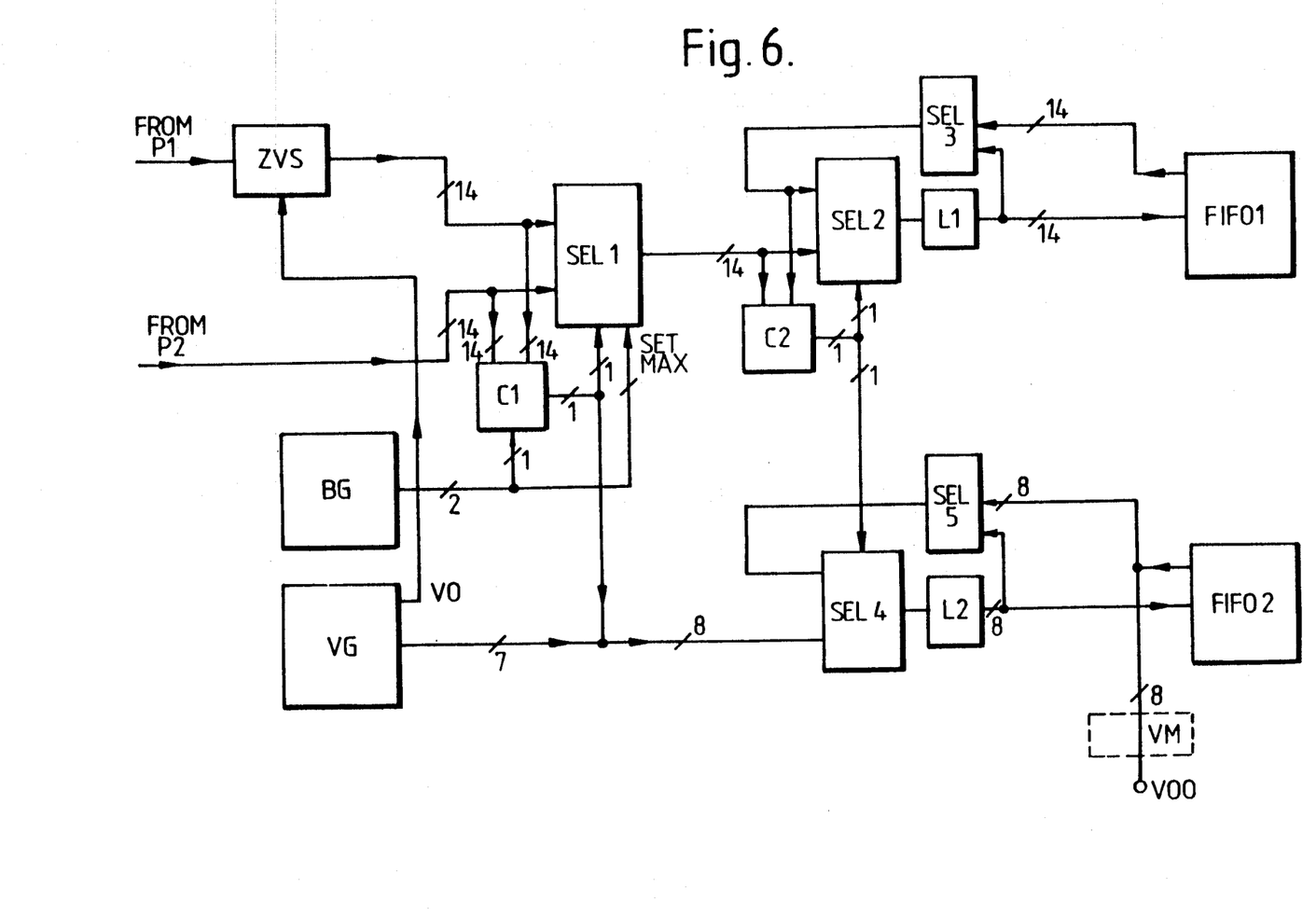
FIG. 6 is a block diagram of the sorter CSO of FIG. 5.

Unit CSO is shown in FIG. 6 and is identical to CSE (except for the timing of the inputs, of course).

The outputs of the processors P1, P2 are applied to the unit. A vector generator VG synchronised by pixel clock (and line and field synchronising pulses) produces the value of the vector component u (4 bits) and the lower 3 bits of component v associated with the E value being received from the processor P1.

The two E values received simultaneously from P1 and P2 always relate to the same block of the current picture, so that these can readily be compared by a comparator C1. The comparator output controls a data selector SEL1 to output the smaller of the received values; the comparator output also is appended to the vector generator output to form the most insignificant bit of v.

The description so far has conveniently ignored problems that may arise where the block under consideration is within 8 lines or pixels of the edge of the picture—i.e. certain of the regions defined by x, y, u, v overlap the line and field blanking periods. This is readily overcome by disregarding such regions. A border detector BG serves to override the action of the selector SEL1 by:

(a) at the top of the picture, where results for such regions are produced by processor P2, forcing the selector to pass the output from processor P1;

(b) at the bottom of the picture, where results for such regions are produced by the processor P1, forcing the selector to pass the output from processor P2;

(c) at the sides of the picture, where both processors produce such results, setting the output of the selector to its maximum value, thereby obliging the subsequent stages of the sorter to select a different value.

A first-in-first-out store FIFO1 stores the lowest E value for each odd block of a row. All the store locations are set to their maximum value at the commencement of a row. Each processor pass generates, for any block N, sixteen E values in succession. When the first of these is received from the selector SEL 1 a comparator C2 compares it with the prevous value recorded in the store for the relevant block and controls the selector SEL2 to enter into a ltach whichever is the lower of the two values. A second selector SEL3 then switches to feed the latch output to the comparator C2 (and selector SEL1) and the comparator compares each of the remaining fifteen values with the value held in the latch L1; again, the selector SEL1 passes the lower value of the pair to form the new latched value. After the sixteen values have been compared, the content of the latch is loaded back into the store. In the same manner, selectors SEL4, SEL5 and latch L2 select for entry into a second store FIFO2 wither the vector previously stored therein or the incoming vector (from VG and C1).

After all eight passes of the current row have taken place, the store FIFO1 contains the lowest "sum of differences" value E for each block of the row, and the store FIFO2 contains the corresponding vectors u,v.

These can then be read out and output to the output VOO prior to the processing of the next row.

In some circumstances it may be easier to generate in the vector generator VG vectors which are coded differently from those required at the output, in which case a vector mapping unit VM—which may be a simple look-up table—can be included.

It has been assumed that the previous frame region to be identified is the one having the smallest difference from the current block in question. However it may be desired to give a bias to the zero vector—i.e. a non-zero vector is output only if a region u,v gives a sum of differences E(u,v) which is less by a predetermined amount than the value E (O,O) for the undisplaced region of the previous frame—e.g. is less than 75% of E(O,O). This can be achieved by a scaling unit ZVS which normally passes the valves received from the processor P1 unchanged, but reduces the value to 75% of the input value when a signal VO from the vector generator VG indicates a position (O,O).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A motion detector for video signals comprising: means (DS, CS, CL, LD, PS) for reception and temporary storage of signals representing one frame of a picture and of signals representing another frame of the picture; arithmetic means (M, A and AA of P1 and P3) for comparing each of a plurality of blocks (N) into which the saie one fram eis divided with the corresponding region of the other frame and with a plurality of positionally shifted regions of the other frame which represent a desired two-dimensional search extent (SI) and means responsive to the results of the comparisons to produce vector information (VOO, VOE) indicating the positional shift if any between the position of each said block and the position of the region of the other frame which meets a criterion of similarity between said blocks and regions, characterized in that the arithmetic means are arranged in operation to carry out all comparisons involving any line n of the said other frame before carrying out comparisons involving the n+p of said other frame, where p is the number of lines encompassed by a block.

2. A detector according to claim 1 in which the reception and storage means comprise:
(i) delay and storage means (DS, CS, CL) for simultaneously making available, for a period corresponding to a desired search extent in the line direction of the picture, a group of picture elements corresponding to a block of the said one frame, where successive groups within a sequence of such groups correspond to respective non-overlapping blocks and that sequence is repeated for p line periods; and
(ii) delay means (LD, PS) for making simultaneously available a group of picture elements corresponding to a region of the other frame of the same size as the block, where successive groups within a sequence of such groups correspond to regions progressively shifted in a direction along the lines of the picture and successive such sequences correspond to regions progressively shifted in the perpendicular direction;

and in which the arithmetic means (M, A and AA) are arranged in operation to form the sum of the moduli or other monotonically increasing even function of the differences between the elements made available for a block and the elements made available for a reigon and that the means (CSO, CSE) for producing vector information are arranged in operation to ascertain for each block the vector information corresponding to the region whose sum meets the said criterion.

3. A detector according to claim 2 inw hich the desired search extent in he line direction is greater than or equal to rtwice the extent of a block in that direction, the delay and storage means are arranged concurrently to form a plurality q (where q is an integer greater than one) of different sequences containing groups of picture elements corresponding to every q-th block in the line direction, and the arithmetic means comprise a plurality q of arrangements for forming the said sums for the respective sequences.

4. A detector according to calim 2 or 3 inw hich the delay means (or delay and storage means) is arranged concurrently to make available an additional sequence corresponding to regions (or blocks) shifted by p lines relative to the first mentioned sequence, that the detector includes additional arithmetic means (N, A and AA of P2 and P4) responsive to the additional sequence to compare each block of the said one frame with a further plurality of positionally shifted regions of the said other frame, which represent an extension (S2) of the said search extent, and that the means (CSO, CSE) for producing vector information are connected to receive the sums from both the first mentioned arithmetic means (in P1, P3) and the additional arithmetic means (in P2, P4).

5. A detector according to claim 1 in which the means to ascertain the vector information comprise means (C1, C2) for comparing values output by the arithmetic means in respect of a block with that one of the previous values for that block which meets the criterion, and includes means (FIFO1) for intermediate storage of partial results during comparisons of values for other blocks.

6. A detector according to claim 1 in which the means to ascertain the vector information includes means (VG) for generating vector values corresponding to the regions represented by the values output by the arithmetic means, switching means (SEL4, L2, SEL5) to select the vector value corresponding to the latest region to meet the criterion, and means (FIFO2) for intermediate storage of the vector values corresponding to the said intermediately stored partial results.

7. A detector according to claim 1 in which the said criterion is met by a region for which a comparison value equal in the case of the unshifted region to a predetermined proportion of the said sum and equal in the case of the other regions to the said sum is less than the comparison value for all other regions compared with the block.

8. A detector according to calim 2 in which the delay means (or delay and storage means) is arranged concurrently to make available an additional sequence corresponding to regions (or blocks) shifted by p lines relative to the first mentioned sequence, that the detector includes additional arithmetic means (M, A and AA of P2 and P4) responsive to the additional sequence to compare each block of the said one frame with a further plurality of positionally shifted regions of the said other frame, which represent an extension (S2) of the said search extent, and that the means (CSO, CSE) for producing vector information are connected to receive the sums from both the first mentioned arithmetic means (in P1, P3) and the additional 9. A detector according to claim 2 in which the means to ascertain the vector information comprise means (C1, C2) for comparing values output by the arithmetic means in respect of a block with that one of the previous values for that block which meets the criterion, and includes means (FIFO1) for intermediate storage of partial results during comparisons of values for other blocks.

10. A detector according to claim 3 in which the means to ascertain the vector information comprises means (C1, C2) for comparing values output by the arithmetic means in respect of a block with that one of the previous values for that block which meets the criterion, and includes means (FIFO1) for intermediate storage of partial results during comparisons of values for other blocks.

11. A detector according to claim 4 in which the means to ascertain the vector information comprises means (C1, C2) for comparing values output by the arithmetic means in respect of a block with that one of the previous values for that block which meets the criterion, and includes means (FIFO1) for intermediate storage of partial results during comparisons of values for other blocks.

12. A detector according to claim 2 in which the said criterion is met by a region for which a comparison value equal in the case of the unshifted region to a predetermined proportion of the said sum and equal in the case of the other regions to the said sum is less than the comparison value for all other regions compared with the block.

13. A detector according to claim 3 in which the said criterion is met by a region for which a comparison value equal in the case of the unshifted region to a predetermined proportion of the said sum and equal in the case of the other regions to the said sum is less than the comparison value for all other regions compared with the block.

14. A detector according to claim 4 in which the said criterion is met by a region for which a comparison value equal in the case of the unshifted region to a predetermined proportion of the said sum and equal in the case of the other regions to the said sum is less than the comparison value for all other regions compared with the block.

15. A detector according to claim 5 in which the said criterion is met by a region for which a comparison value equal in the case of the unshifted region to a predetermined proportion of the said sum and equal in the case of the other regions to the said sum is less than the comparison value for all other regions compared with the block.

16. A detector according to claim 6 in which the said criterion is met by a region for which a comparison value equal in the case of the unshifted region to a predetermined proportion of the said sum and equal in the case of the other regions to the said sum is less than the comparison value for all other regions compared with the block.

17. A detector according to claim 8 in which the said criterion is met by a region for which a comparison value equal in the case of the unshifted region to a predetermined proportion of the said sum and equal in the case of the other regions to the said sum is less than the comparison value for all other regions compared with the block.

18. A detector according to claim 9 in which the said criterion is met by a region for which a comparison value equal in the case of the unshifted region to a predetermined proportion of the said sum and equal in the case of the other regions to the said sum is less than the comparison value for all other regions compared with the block.

19. A detector according to claim 10 in which the said criterion is met by a region for which a comparison value equal in the case of the unshifted region to a predetermined proportion of the said sum and equal in the case of the other regions to the said sum is less than the comparison value for all other regions compared with the block.

* * * * *